United States Patent [19]

Sheu et al.

[11] Patent Number: 5,062,700
[45] Date of Patent: Nov. 5, 1991

[54] REARVIEW DIRECTIONAL CONTROL DEVICE FOR REARVIEW MIRROR

[76] Inventors: Shyh-Her Sheu, No. 18, Shihchien Street, Peitoa; Yu-Ming Tsui, No. 16-11, 3rd. Floor Lane 189, Sec. 4, Cheng Kung Road, Neihu Locality, Taipei, both of Taiwan

[21] Appl. No.: 638,539

[22] Filed: Jan. 8, 1991

[51] Int. Cl.⁵ .................. G02B 7/198; G02B 5/08; B60S 1/34; B60S 1/46
[52] U.S. Cl. .................. 359/508; 359/509; 359/507; 359/877
[58] Field of Search ............ 350/637, 583, 584, 632, 350/636, 486

[56] References Cited

U.S. PATENT DOCUMENTS

| | | | |
|---|---|---|---|
| 3,459,430 | 8/1969 | Hahn | 350/637 |
| 3,575,496 | 4/1971 | Pollock | 350/637 |
| 3,799,658 | 3/1974 | Pignatelli | 350/637 |
| 4,136,925 | 11/1979 | Menzies et al. | 350/583 |
| 4,699,478 | 10/1987 | Tsui et al. | |
| 4,834,522 | 5/1989 | Janowicz | 350/637 |
| 4,925,289 | 5/1990 | Cleghorn et al. | 350/637 |

FOREIGN PATENT DOCUMENTS

| | | | |
|---|---|---|---|
| 2708328 | 9/1977 | France | 350/637 |
| 3103908 | 11/1982 | France | 350/637 |

*Primary Examiner*—Jon W. Henry

[57] ABSTRACT

A novel rearview directional control device for a rearview mirror, either a conventional rearview mirror or a self-cleaning rearview mirror, is provided. The present rearview directional control device for a conventional rearview mirror includes a mirror body mounting therein a spherical plain bearing having an inner ring securing therein a sleeve coaxially fixing thereto a mirror disk having a mirror, an eccentrical wheel engaging with the sleeve and having a rotating axis non-parallel to the shaft axis in a manner that when rotated, the shaft axis will be inclined.

7 Claims, 6 Drawing Sheets

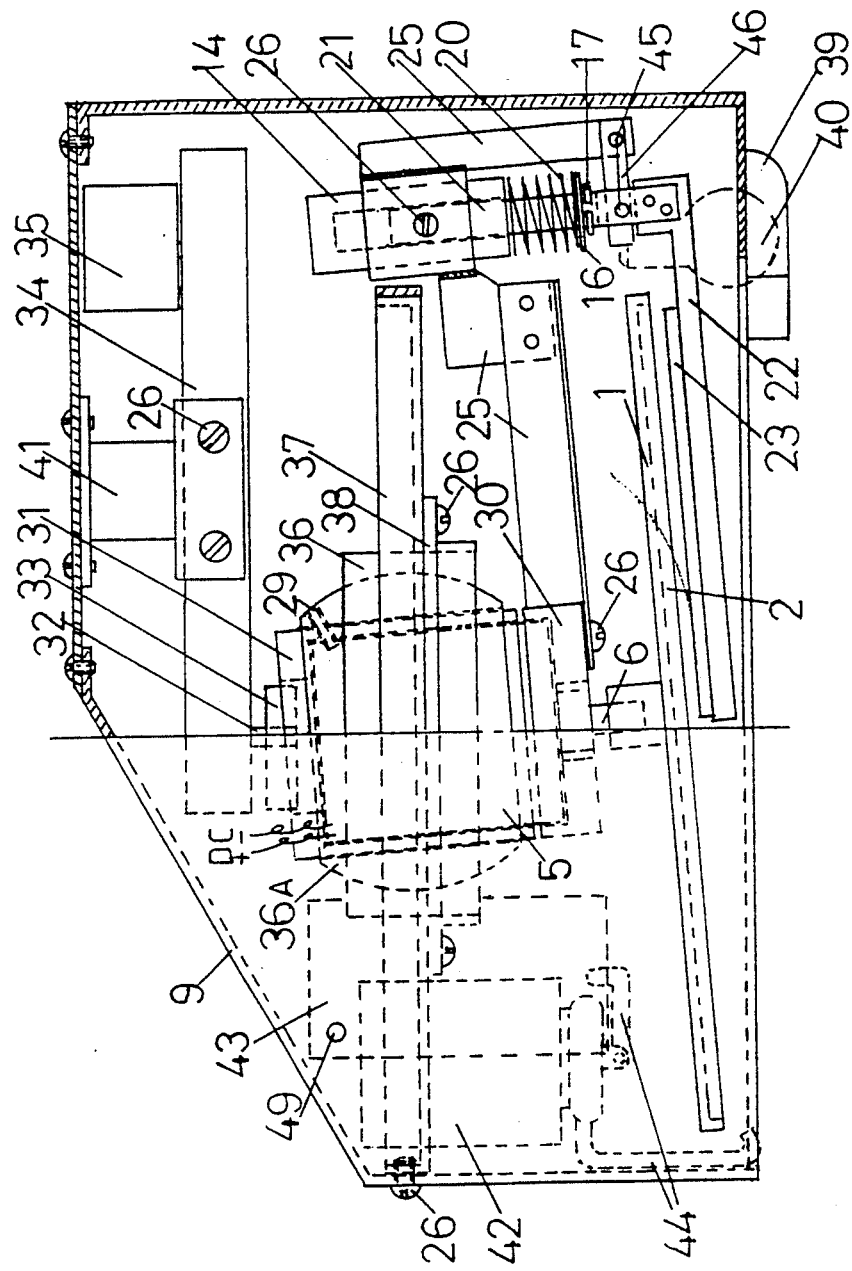

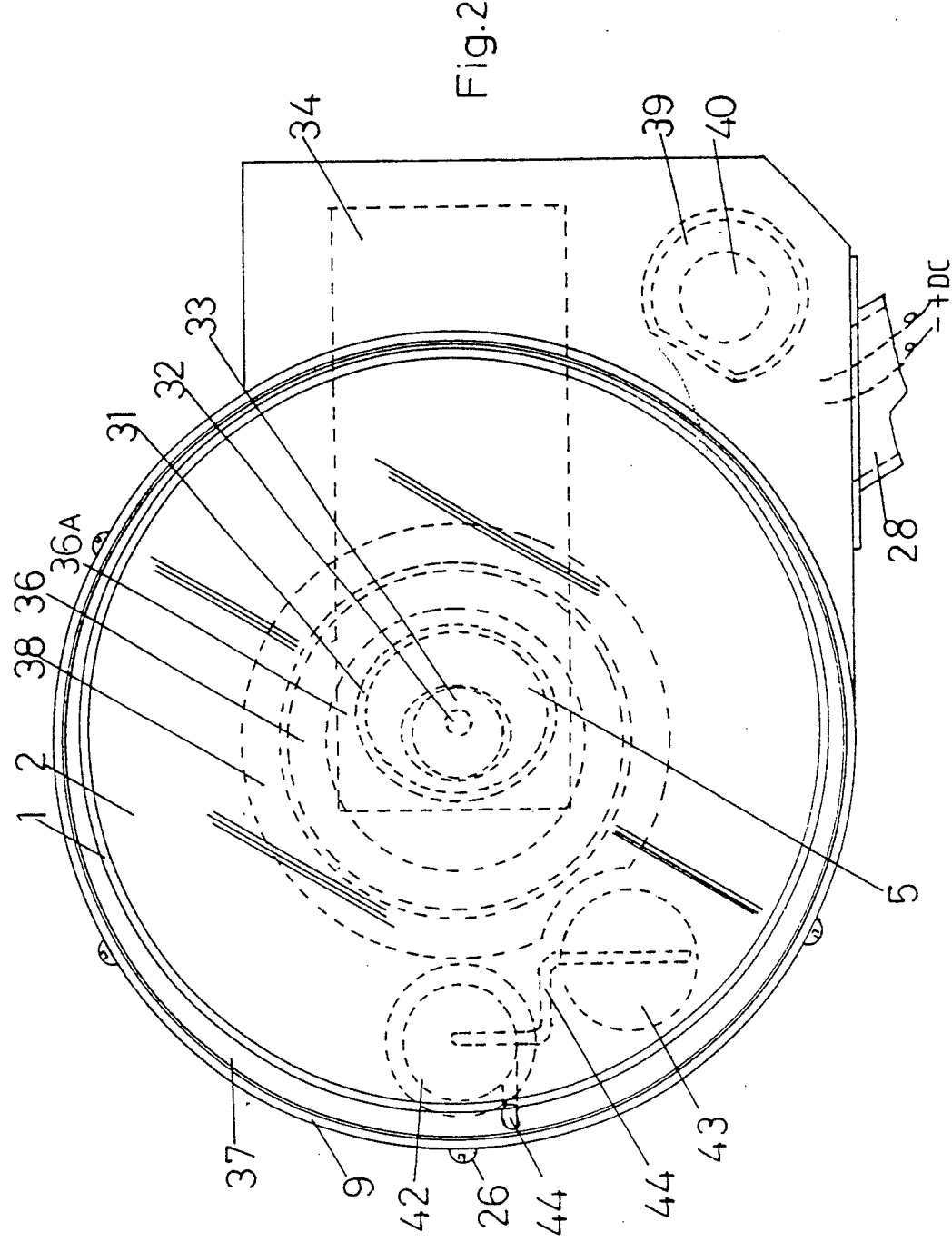

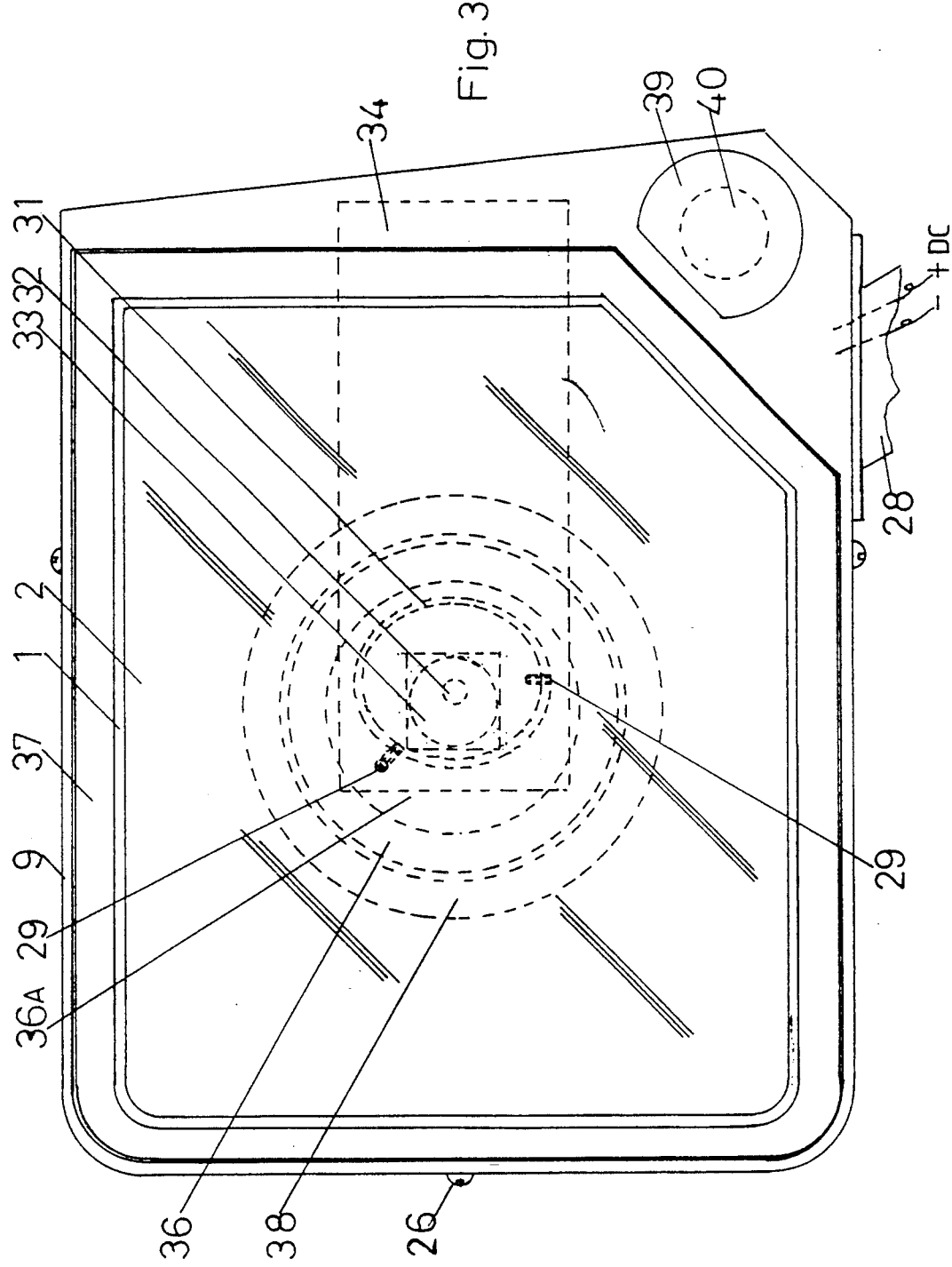

REARVIEW DIRECTIONAL CONTROL DEVICE FOR REARVIEW MIRROR

BACKGROUND OF THE INVENTION

The present invention relates to a rearview directional control device for the rearview mirror, and more particularly to a self-cleaning one.

The rearview mirror is improvedly designed to be self-cleaning for a convenient purpose or for facilitating one's driving an automobile in a rainy or snowy weather The present invention aims to diversify and further improve the improved rearview mirror

BRIEF DESCRIPTION OF THE PRIOR ART

The conventional rearview directional control device (not shown in the drawings) for a rearview mirror usually consists of a mirror disk having a mirror on one side and having two screw bolts with universal jointers on the other side, each of these two bolts is meshed with a gear with screw center hole and each of these two gears is connected to and can be driven by a DC motor so that when the DC motor is energized, the gear will be rotated and its screw center hole will adjust the length of the screw bolt with universal jointer so as to change the position and angle of the rearview mirror The drawbacks of the conventional rearview directional control device are:

a. when adjusting the angle of the mirror said angle has its limitation and hence results that such a conventional device can not be used with the rearview mirrors on large cars such as buses, trucks, etc.:

b. two motors are required to adjust the angle of the mirror and thus complicates the manufacturing:

c. when the motors are driving each of the two bolts moving between its two ends, improper operations from the driver may cause the device to broken-down.

SUMMARY OF THE INVENTION

It is an object of the present invention to provide a novel rearview directional control device for the rearview mirror which is free from the drawbacks of the conventional ones.

It is another object of the present invention to provide an improved wiping arrangement for the rearview mirror.

It is further an object of the present invention to provide an illuminating device and a built-in pumping device for the rearview mirror.

According to the present invention, the rearview directional control device for a conventional rearview mirror includes a mirror body mounting therein a spherical plain bearing having an inner ring securing therein a sleeve coaxially fixing thereto a mirror disk having a mirror, an eccentrical wheel engaging with the sleeve and having a rotating axis non-parallel to the shaft axis in a manner that when rotated, the shaft axis will be inclined.

The present invention of the rearview directional control device can also be used on a self-cleaning rearview mirror as defined in U.S. Pat. No. 4,699,478 owned by the same applicants which includes a mirror body mounting therein a spherical plain bearing having an inner ring securing therein a sleeve mounting therein a motor having a shaft coaxially fixing thereto a mirror disk having a mirror, an eccentrical wheel engaging with the sleeve and having a rotating axis non-parallel to the shaft axis in a manner that when rotated, the shaft axis will be inclined, a holder kept fixed with respect to the motor and fixing thereto an electrical magnet having a core slidable in the direction of the shaft axis, and a wiper fixed to the magnet core and kept parallel to the mirror.

The present invention may best be understood through the following description with reference to the accompanying drawings.

BRIEF DESCRIPTION OF THE DRAWING

FIG. 1 is a structural top view showing the present rearview directional control device with a self-cleaning rearview mirror;

FIG. 2 is a front view showing a self-cleaning rearview mirror in FIG. 1;

FIG. 3 is a front view showing the present rearview directional control device with a conventional rearview mirror;

DETAILED DESCRIPTION OF THE PREFERRED EMBODIMENT

Figure 4C:
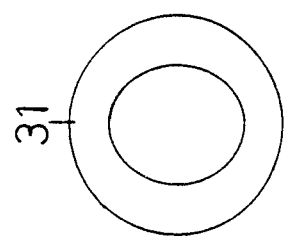
FIG. 4A–4C are end views respectively showing three different embodiments of an open end of a sleeve of the present device.
Figure 4B:
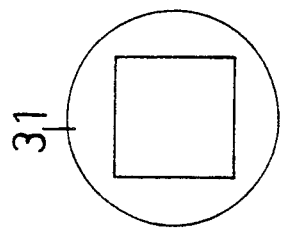
Figure 4A:
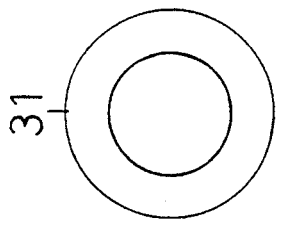
Figure 4:
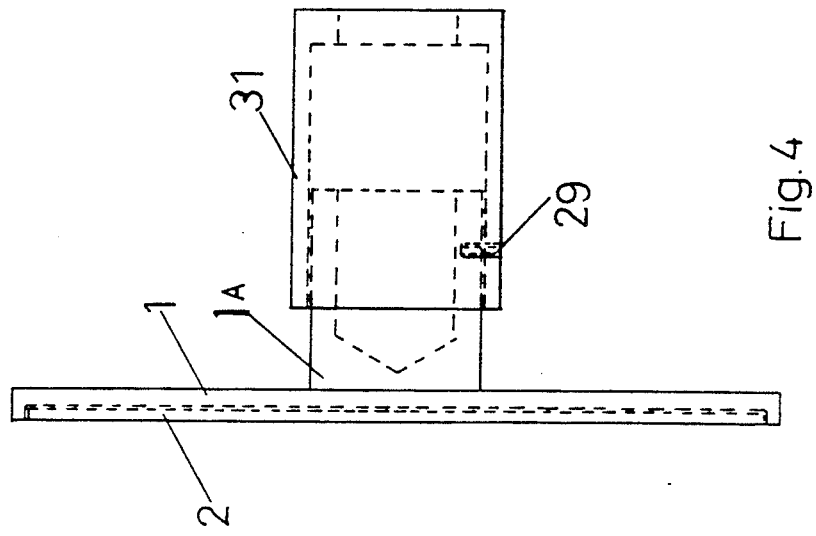
FIG. 4 is a schematic view showing the engagement of a mirror disk and a sleeve of a conventional rearview mirror in FIG. 3.
Figure 5:
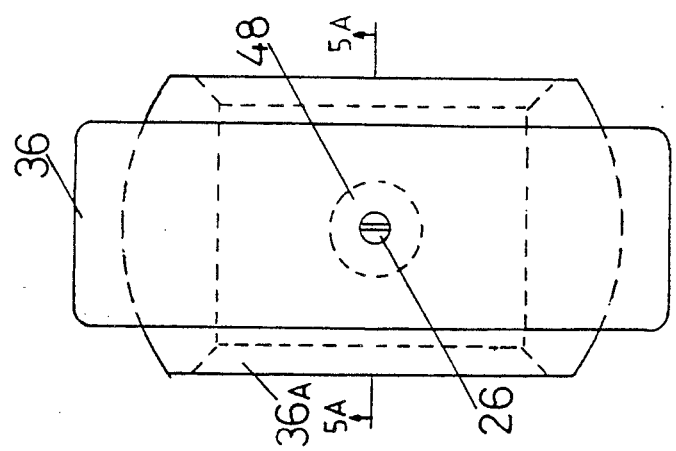
FIG. 5 is a side view of a spherical plain bearing of the present device.
Figure 5A:
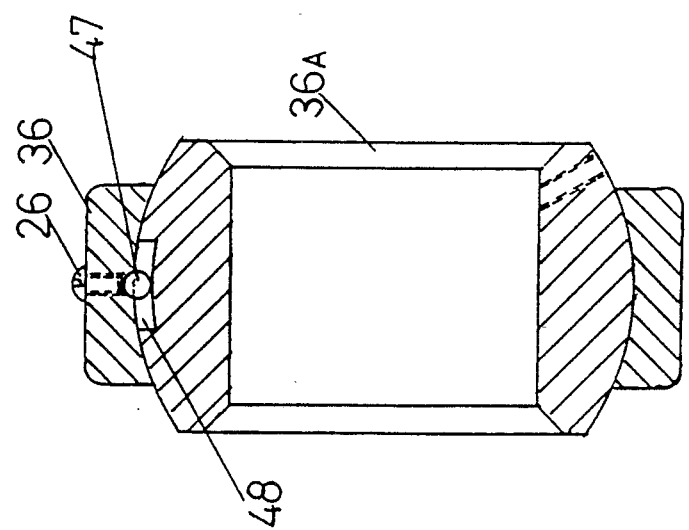
FIG. 5A is a sectional view alone line 5A—5A of FIG. 5.
Figure 6:
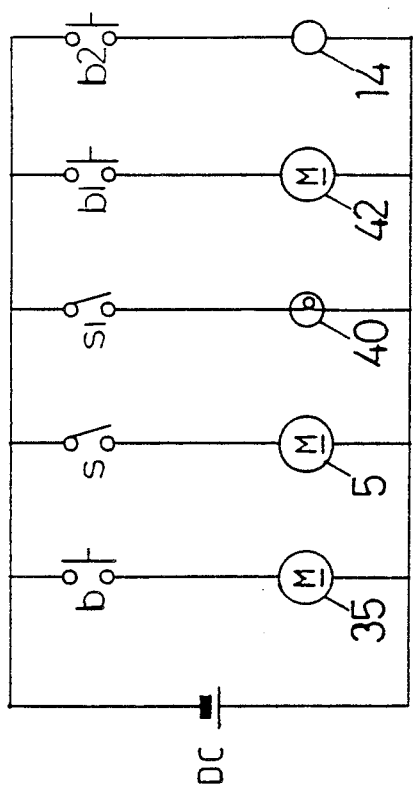
FIG. 6 is a schematic view showing the remote circuit of DC motors 5, 35 and 42, electric magnet 14, and bulb 40.

Referring now to FIGS. 1-6, a first embodiment of the present rearview directional control device with a conventional rearview mirror (as shown in FIG. 3) includes a rearview mirror body 9 having a first holder 37 having a flange 38 mounting thereon a spherical plain bearing 36 having an inner ring 36A, a sleeve 31, an eccentrical wheel 33. Sleeve 31 is secured in inner ring 36A, and has an open end being crossectionally circularly, squarely, rectangularly or elliptically holed (as shown in FIGS. 4A–4C). A circular recess 48 is provided on the outer surface of inner ring 36A, and partly receives therein a steel ball 47 mounted between inner ring 36A and the outer ring of spherical plain bearing 36 (as shown in FIG. 5 and FIG. 5A) for preventing inner ring 36A from excessively rotating in the outer ring of spherical plain bearing 36. A mirror 2 is fixed on one side of mirror disk 1 and a disk shaft 1A is provided on the other side thereof, and disk shaft 1A is secured in the other end of sleeve 31 by the slotted set screw 29 (as shown in FIG. 4).

Eccentrical wheel 33 is secured to a power output shaft 32 of a gear box 34 which is mounted on a second holder 41 of body 9 and has a power input end connected to a first DC motor 35 (as shown in FIG. 1). Wheel 33 has a speed of 5-2 rpm and engages in the open end of sleeve 31 for inclining sleeve 31 to adjust the inclining angle of mirror 2 with respect to one side of a vehicle incorporating thereon body 9. The degree or range of the adjustment is determined by the eccentricity of wheel 33 and the shape of the inner surface of the holed open end of sleeve 31 for desiredly coping with the various need of a bus, a truck or a car. An illuminating bulb 40 may be further mounted in body 9 and is shaded by a shade 39 for providing a light to mirror 2 for enabling the driver of the vehicle provided with the present rearview mirror to clearly see the image on mirror 2 in the nighttime.

A second embodiment of the present rearview directional control device with a self-cleaning rearview mirror as defined in U.S. Pat. No. 4,699,478 owned by the same applicants is almost identical with the above-mentioned first embodiment but further includes a third holder 25, an electrical magnet 14 fixed to holder 25, a wiper 23, an illuminating bulb 40, and a water tank 43, and that a second DC motor 5 is secured within sleeve 31 and inner ring 36A by slotted set screw 29 having a shaft 6 coaxially fixing thereto a mirror disk 1 having a mirror 2 (as shown in FIG. 1). Holder 25 is fixed to a cap 30 secured to the second motor 5 mounts thereon a DC electrical magnet 14 having an iron core 21 fixing thereto a fourth holder 22 holding thereon a wiper 23 kept parallelly related to mirror 2. A lever 46 has two ends thereof respectively pivotally connected to two pivots 45 respectively on core 21 and holder 25 so that core 21 can only unrotatably and limitedly slide in magnet 14 in the direction parallel to the axis of shaft 6 so that mirror 2 and sleeve 31 can be adjusted or inclined by eccentrical wheel 33 and when electrical magnet 14 is energized, wiper 23 will come in contact instantaneously with mirror 2 to clean the surface of mirror 2.

Tank 43 having a water inlet 49 is mounted on first holder 37 also mounting thereon a pump-equipped third DC motor 42 so that the length of the pipeline 44 required is reduced. Bulb 40 is mounted in body 9 and is shaded by a shade 39 for providing a light to mirror 2 for enabling the driver of the vehicle provided with the present rearview mirror to clearly see the image on mirror 2 in the nighttime.

When in use, the angle of mirror 2 can be adjusted by pushing push button b so that motor 35 will be energized and drive wheel 33 to a proper position and then stopped by releasing push button b (please refer to FIGS. 1, 2, 3 and 6). The dust and other particles accumulated on the surface of mirror 2 can be cleaned by switching switch s to "ON" so that motor 5 will be energized and then drive disk 1 mounted on the shaft of motor 5 and accordingly drive mirror 2 to rotate and by pushing push button b1 to energize motor 42 so that water will be pumped onto the surface of mirror 2 and then by pushing push button b2 to enable electric magnet 14 to drive wiper 23 to instantaneously contact the surface of mirror 2. Bulb 40 can be electrified by switching switch s1 to provide a light to mirror 2.

We claim:

1. A rearview directional control device for a rearview mirror comprising:
    a rearview mirror body adapted to be fixed to one side of a vehicle:
    a spherical plain bearing mounted in said body and having an inner ring:
    a sleeve secured in said inner ring, having an open end;
    a gear box mounted on said body having a power output shaft and a power input end:
    an eccentrical wheel secured to said power output shaft and is engagingly received in said open end;
    a motor mounted on said body and is connected to said power input end:
    a mirror fixed on one side of a mirror disk and a disk shaft is provided on the other side of said mirror disk; and
    said disk shaft is engaged in the other end of said sleeve,
    such that when said motor is energized, the angle of said mirror will be adjusted.

2. A rearview directional control device for a rearview mirror according to claim wherein a circular recess is provided on the outer surface of said inner ring and partly receives therein a ball mounted between said inner ring and the outer ring of said spherical plain bearing for preventing said inner ring from excessively rotating in said outer ring of spherical plain bearing.

3. A rearview directional control device for a rearview mirror according to claim 1, further comprising an illuminating bulb mounted in said body for providing a light to said mirror.

4. A rearview directional control device for a rearview mirror comprising:
    a rearview mirror body adapted to be fixed to one side of a vehicle:
    a spherical plain bearing mounted in said body and having an inner ring:
    a sleeve secured in said inner ring, having an open end;
    a gear box mounted on said body having a power output shaft and a power input end;
    an eccentrical wheel secured to said power output shaft and engagingly received in said open end:
    a first motor mounted on said body and connected to said power input end;
    a second motor secured within said sleeve and said inner ring having a shaft:
    a mirror fixed on one side of a mirror disk and said shaft of the second motor coaxially fixed to the other side of said mirror disk;
    an electrical magnet fixed to said holder and having a magnet core slidable in a direction parallel to the direction of said shaft axis: and
    a wiper fixed to said magnet core and kept parallel to said mirror,
    such that when said first motor is energized, the angle of said mirror will be adjusted; when said second motor is energized, said mirror will be rotated: and when said magnet is energized, said wiper will contact said mirror instantaneously.

5. A rearview directional control device for a rearview mirror according to claim 4 wherein a circular recess is provided on the outer surface of said inner ring and partly receives therein a ball mounted between said inner ring and the outer ring of said spherical plain bearing for preventing said inner ring from excessively rotating in said outer ring of spherical plain bearing.

6. A rearview directional control device for a rearview mirror according to claim 4, further comprising an illuminating bulb mounted in said body for providing a light to said mirror.

7. A rearview directional control device for a rearview mirror according to claim 4, further comprising a water tank mounted in said body, and a pump device mounted in said body for pumping water from said tank to said mirror.

* * * * *